United States Patent
Chavannavar

(10) Patent No.: US 8,875,501 B2
(45) Date of Patent: Nov. 4, 2014

(54) POWER SYSTEM FOR CONTROLLING PHOSPHORUS AGING

(71) Applicant: Caterpillar Inc., Peoria, IL (US)

(72) Inventor: Praveen S. Chavannavar, Dunlap, IL (US)

(73) Assignee: Caterpillar Inc., Peoria, IL (US)

( * ) Notice: Subject to any disclaimer, the term of this patent is extended or adjusted under 35 U.S.C. 154(b) by 7 days.

(21) Appl. No.: 13/766,953

(22) Filed: Feb. 14, 2013

(65) Prior Publication Data

US 2014/0075921 A1    Mar. 20, 2014

Related U.S. Application Data

(60) Provisional application No. 61/701,592, filed on Sep. 15, 2012.

(51) Int. Cl.
| | | |
|---|---|---|
| F01N 3/00 | (2006.01) | |
| F01N 3/10 | (2006.01) | |
| F01N 3/20 | (2006.01) | |

(52) U.S. Cl.
CPC ........................... F01N 3/20 (2013.01)
USPC .................... 60/299; 60/274; 60/286; 60/301; 60/303

(58) Field of Classification Search
USPC ........... 60/274, 277, 286, 295, 297, 299, 301, 60/303, 311
See application file for complete search history.

(56) References Cited

U.S. PATENT DOCUMENTS

| | | |
|---|---|---|
| 7,240,482 B2 | 7/2007 | Hepburn et al. |
| 7,533,523 B2 | 5/2009 | Wang et al. |
| 7,587,889 B2 | 9/2009 | Frazier et al. |
| 7,625,201 B2 | 12/2009 | Ingalls, Jr. et al. |
| 7,627,410 B2 | 12/2009 | Berry et al. |
| 8,340,872 B2 | 12/2012 | Mintah et al. |
| 2007/0135985 A1 | 6/2007 | Berry et al. |
| 2007/0260380 A1 | 11/2007 | Mintah et al. |

(Continued)

FOREIGN PATENT DOCUMENTS

| | | |
|---|---|---|
| GB | 2 452 354 | 3/2009 |
| JP | 6-26381 | 2/1994 |
| JP | 2002-256951 | 9/2002 |

OTHER PUBLICATIONS

Chavannavar, "Development of a Numerical Model to Predict the Impact of Phosphorus on Flow Through Aftertreatment Components," SAE International, Apr. 16, 2012; 9 pp.

*Primary Examiner* — Audrey K Bradley
(74) *Attorney, Agent, or Firm* — Finnegan, Henderson, Farabow, Garrett & Dunner LLP

(57) ABSTRACT

A method of controlling a power system including an engine and an exhaust treatment system having an exhaust treatment device is disclosed. The method includes determining a catalyst parameter indicative of a conversion efficiency of the exhaust treatment device. The method further includes determining a weighted index based on the catalyst parameter. The method further includes determining a plurality of first index values. In the method, each first index value of the plurality of first index values is predicted as a function of a corresponding respective aftertreatment control strategy. The method further includes selecting an aftertreatment control strategy based on a comparison between the weighted index and each first index value of the plurality of first index values. In the method, the selected aftertreatment control strategy changes the catalyst parameter. The method also includes operating the exhaust treatment system according to settings corresponding to the selected aftertreatment control strategy.

19 Claims, 4 Drawing Sheets

(56) References Cited

U.S. PATENT DOCUMENTS

2008/0066451 A1* 3/2008 Warner et al. .................. 60/286
2011/0023462 A1* 2/2011 Kurtz et al. .................... 60/286
2012/0280819 A1* 11/2012 Kowalkowski et al. ...... 340/633

* cited by examiner

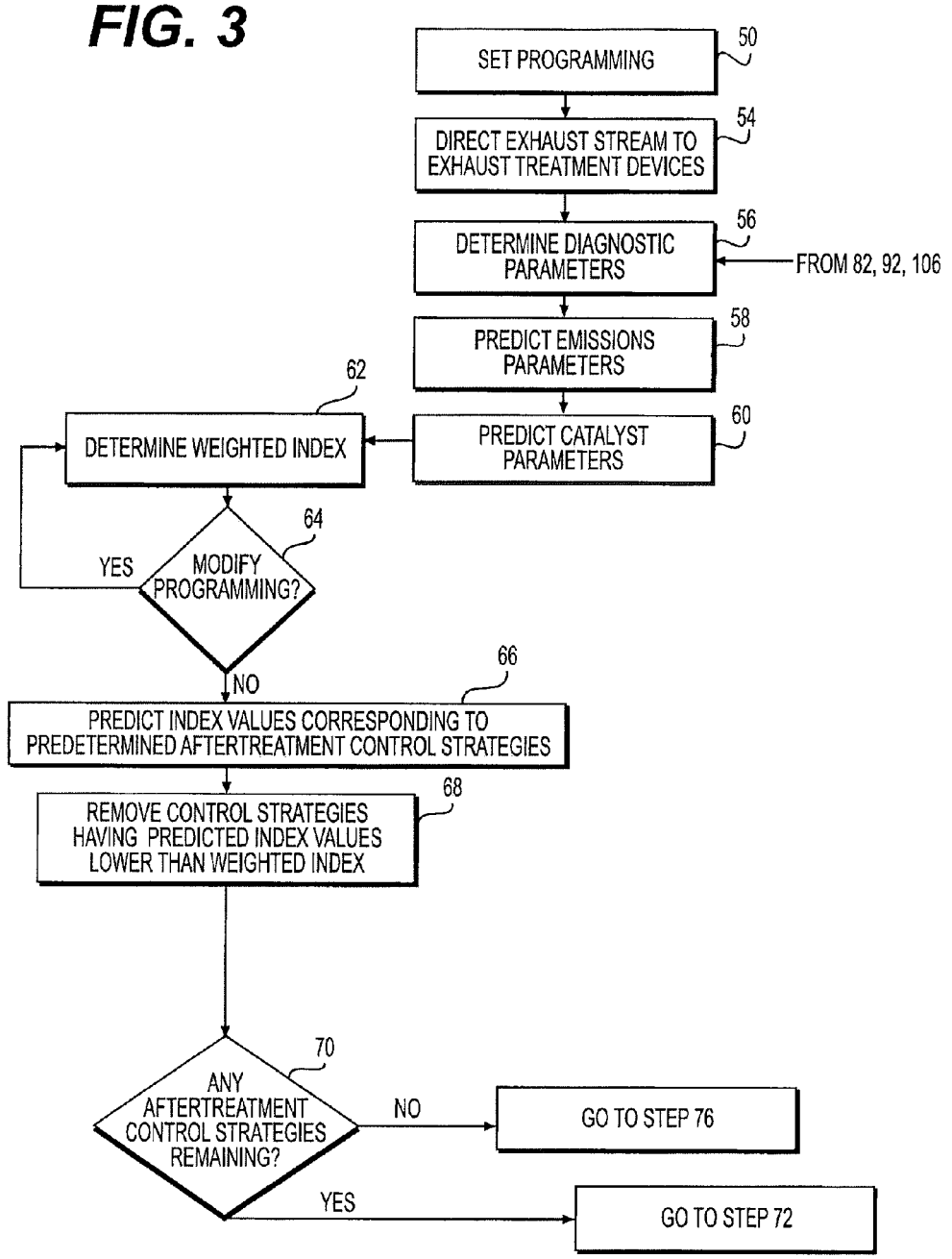

POWER SYSTEM FOR CONTROLLING PHOSPHORUS AGING

This application claims the benefit of U.S. Provisional Application No. 61/701,592, filed Sep. 15, 2012, the contents of which are expressly incorporated herein by reference.

TECHNICAL FIELD

The present disclosure relates generally to a power system for a machine, and more particularly, to a power system including a catalyzed substrate and a control module.

BACKGROUND

The composition of exhaust produced by the combustion of hydrocarbon fuels includes a mixture of particulate matter (soot), oxide gases (such as, for example, $NO_X$, $SO_X$, etc.), and unburned hydrocarbons. To comply with emission standards, engine manufacturers have developed and implemented a variety of exhaust treatment devices to reduce pollutants in exhaust gas prior to the exhaust gas being released into the atmosphere. These exhaust treatment devices may include, for example, a diesel particulate filter (DPF), a selective catalytic reduction (SCR) device, a diesel oxidation catalyst (DOC), an $NH_3$ oxidation (AMOX) device, and other similar components. These devices capture and/or convert undesirable constituents in exhaust gas into less harmful products as the exhaust gas flows through.

The long-term durability of the exhaust treatment devices is essential for efficient emission control. The durability of these devices can be affected by a variety of factors including engine lubricating oil consumption. For example, during normal engine operation, some of the lubricating oil may be combusted, and the deposition of combustion products from phosphorus-containing lubricant additives can adversely affect the durability of exhaust treatment devices in a process known as "phosphorus aging" or "phosphorus poisoning." To minimize this adverse impact, engines are designed to reduce lubricant consumption, and lubricants are formulated with lower concentrations of phosphorus-containing compounds. However, phosphorus-containing lubricant additives (such as Zinc Dialkyl Dithiophosphate, or ZDDP) are necessary to protect the engine from excessive wear and assist in increasing engine durability. Historically, techniques such as oversizing an exhaust treatment device and regenerating an exhaust treatment device with the addition of scavenging additives have been used to combat phosphorus aging of exhaust treatments devices. However, these techniques typically increase the cost and/or complexity of the exhaust treatment system. While simply removing and replacing a phosphorous-laden catalyst is also an option, replacing the catalyst, which is composed of precious earth metals, can be an expensive operation.

Japanese Patent Application No. 60-26381 (the '381 Application) published on Feb. 1, 1994, discloses an engine control system that detects degradation of the catalyst due to phosphorus poisoning by measuring oil consumption, and adjusts the air-fuel ratio in order to curtail further degradation. While the method of the '381 Application may increase usable life of a catalyst, it has drawbacks. For instance, there may be delays associated with detection of catalyst deterioration and subsequent response. The delays would entail additional adjustments of air-fuel ratios in order to account for any additional deterioration that takes place during the delays. Additionally, the '381 Application does not provide options other than adjusting air-fuel ratio to address catalyst degradation. Furthermore, the '381 Application only measures an oil consumption to determine catalyst degradation without taking into account other relevant parameters such as engine pressure and temperature. This single-parameter approach may compromise the accuracy of the catalyst degradation measurements.

The disclosed exhaust treatment systems are directed at overcoming these and/or other shortcomings in existing technology.

SUMMARY

In one aspect, the present disclosure is directed to a method of controlling a power system including an engine and an exhaust treatment system having an exhaust treatment device. The method includes determining a catalyst parameter indicative of a conversion efficiency of the exhaust treatment device. The method further includes determining a weighted index based on the catalyst parameter. The method further includes determining a plurality of first index values. In the method, each first index value of the plurality of first index values is predicted as a function of a corresponding respective aftertreatment control strategy. The method further includes selecting an aftertreatment control strategy based on a comparison between the weighted index and each first index value of the plurality of first index values. In the method, the selected aftertreatment control strategy changes the catalyst parameter. The method also includes operating the exhaust treatment system according to settings corresponding to the selected aftertreatment control strategy.

In another aspect, the present disclosure is directed to a method of controlling a power system including an engine and an exhaust treatment system. The method includes determining a diagnostic parameter associated with the power system. The method further includes predicting an emissions parameter associated with the exhaust treatment system based on the diagnostic parameter. The method further includes predicting a catalyst parameter associated with the exhaust treatment system based on the emissions parameter. The method further includes determining a weighted index based on the predicted catalyst parameter. The method further includes determining a plurality of index values. In the method, each index value of the plurality of index values is determined as a function of a corresponding respective aftertreatment control strategy. The method also includes selecting an aftertreatment control strategy based on a comparison between the weighted index and each index value of the plurality of index values. In the method, the selected aftertreatment control strategy is characterized by changing an operation setting on the exhaust treatment system.

In another aspect, the present disclosure is directed to a power system including an engine and an exhaust treatment system for an engine. The exhaust treatment system includes an exhaust treatment device including a substrate, the substrate having a catalyst coating. The exhaust treatment system further includes a sensor system configured to determine a diagnostic parameter and an exhaust level associated with the power system. The exhaust treatment system further includes a control module in communication with the sensor system. The control module is configured to determine a catalyst parameter indicative of a conversion efficiency of a power system. The control module is further configured to determine a weighted index based on the catalyst parameter. The control module is further configured to predict a plurality of index values. Each index value of the plurality of index values is predicted as a function of a corresponding respective aftertreatment control strategy. The control module is further configured to select an aftertreatment control strategy based on a comparison between the weighted index and each index value of the plurality of index values. The selected aftertreatment control strategy changes the catalyst parameter. The control module is further configured to operate the exhaust treatment system according to settings corresponding to the selected aftertreatment control strategy and save the selected index value to memory.

In another aspect, the present disclosure is directed to a machine including a power system, wherein the power system includes an engine and an exhaust treatment system for an engine. The exhaust treatment system further includes an exhaust treatment device including a substrate, the substrate having a catalyst coating. The exhaust treatment system further includes a sensor system configured to determine a diagnostic parameter and an exhaust level associated with the power system. The exhaust treatment system further includes a control module in communication with the sensor system. The control module is further configured to determine a catalyst parameter indicative of a conversion efficiency of a power system. The control module is further configured to determine a weighted index based on the catalyst parameter. The control module is further configured to predict a plurality of index values. Each index value of the plurality of index values is predicted as a function of a corresponding respective aftertreatment control strategy. The control module is further configured to select an aftertreatment control strategy based on a comparison between the weighted index and each index value of the plurality of index values. The selected aftertreatment control strategy changes the catalyst parameter. The control module is also configured to operate the exhaust treatment system according to settings corresponding to the selected aftertreatment control strategy. The control module is also configured to save the selected index value to memory.

DETAILED DESCRIPTION

Figure 1:
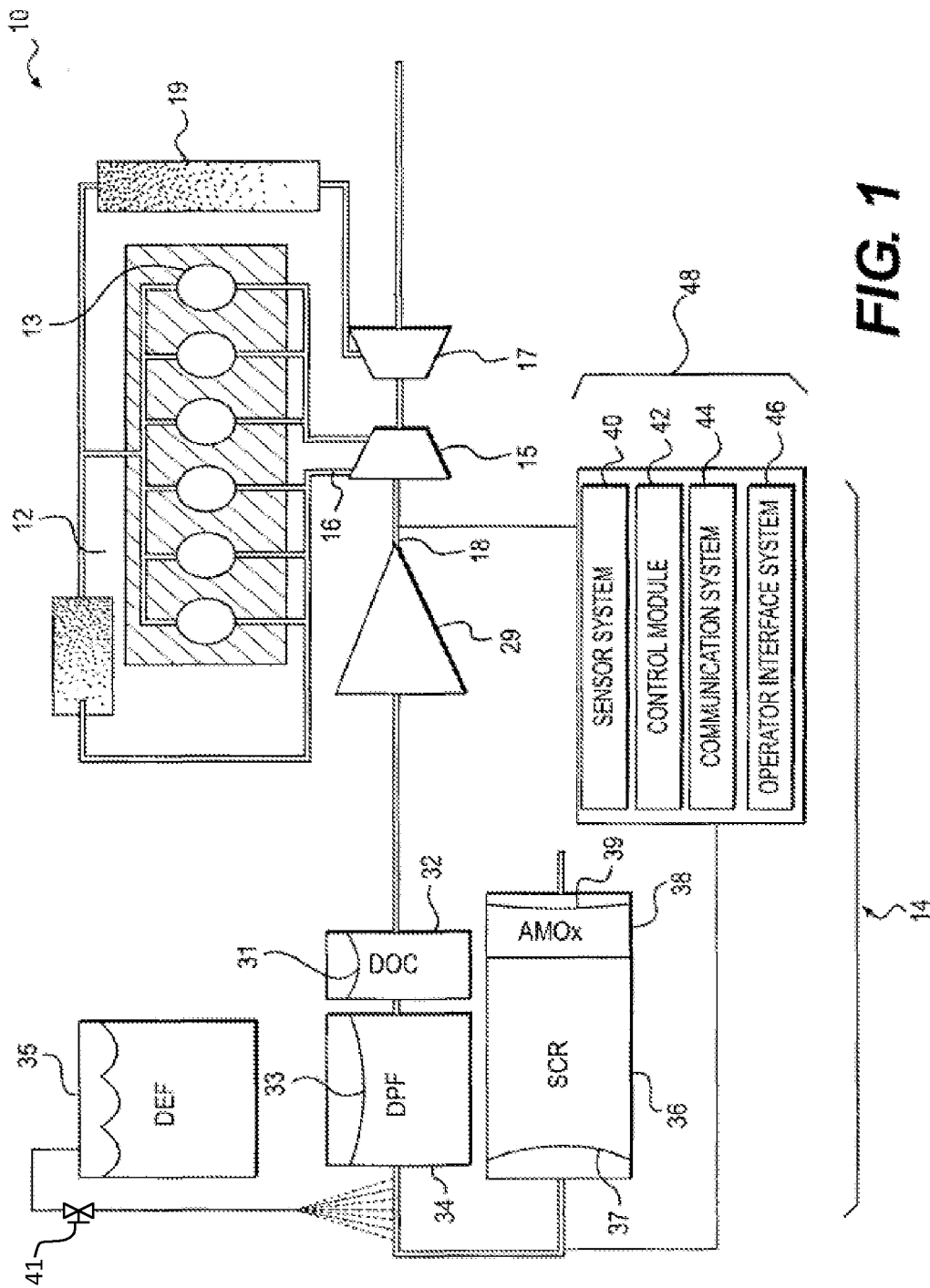
FIG. 1 is an illustration of a power system with an exemplary exhaust treatment system.

FIG. 1 illustrates a power system 10 which includes an engine 12, an exhaust treatment system 14 to treat an exhaust stream 16 produced by engine 12, and a control system 48 including a sensor system 40, a control module 42, a communication system 44, and an operator interface system 46. The power system 10 and engine 12 may include other features and components not shown, such as fuel systems, drive train components, turbochargers, and exhaust gas recirculation systems. The engine 12 may at least partially define a plurality of cylinders 13, and a plurality of piston assemblies (not shown) disposed within cylinders 13 to form combustion chambers. The engine 12 may be any type of internal combustion engine (gasoline, diesel, gaseous fuel, natural gas, propane, etc.), may be of any size, with any number of cylinders, and in any configuration ("V," in-line, radial, etc.). The engine 12 may be used to power any machine or other device, including on-highway trucks or vehicles, off-highway trucks or machines, earth moving equipment, generators, aerospace equipment, locomotive equipment, marine equipment, and/or pumps. An exhaust stream 16 may be directed towards exhaust treatment system via pipes, tubing, and/or other exhaust flow carrying means known in the art (not shown). The flow carrying means may be made of alloys of steel, aluminum, and/or other materials known in the art. The flow carrying means may be rigid or flexible, and may be capable of safely carrying high temperature exhaust flows, such as flows having temperatures in excess of approximately 400 degrees Celsius.

Power system 10 may include an air induction system that includes an air cooler 19 located downstream of one or more compressors 17. Compressors 17 may be connected to pressurize inlet air, and direct the pressurized air through cooler 19. It is contemplated that the air induction system may include different or additional components than described above such as, for example, a throttle valve, variable valve actuators associated with each cylinder 13, filtering components, compressor bypass components, and other known components, if desired. It is further contemplated that compressor 17 and/or cooler 19 may be omitted, if a naturally aspirated engine is desired.

The exhaust treatment system 14 may include multiple components that condition and direct exhaust from cylinders 13 to the atmosphere. For example, exhaust treatment system 14 may include an exhaust conduit 18, one or more turbines 15 driven by the exhaust stream 16 flowing through conduit 18, and one or more exhaust treatment devices 32, 34, 36, and 38 positioned therein. The exhaust treatment devices may include, for example, one or more of a DOC 32, a DPF 34, an SCR device 36, and an AMOX device 38. It is contemplated that exhaust treatment system 14 may include different or additional components than described above such as, for example, bypass components, an exhaust compression or restriction brake, an attenuation device, additional exhaust treatment devices, and other known components, if desired.

Turbine 15 may be located to receive exhaust stream 16 leaving engine 12, and may be connected to one or more compressors 17 by way of a common shaft to form a turbocharger. As the hot exhaust gases in exhaust stream 16 exiting engine 12 move through turbine 15 and expand against vanes (not shown) thereof, turbine 15 may rotate and drive the connected compressor 17 to pressurize inlet air.

As the exhaust stream 16 flows through the exhaust treatment devices 32, 34, 36, 38, the hydrocarbons, $NO_X$, and $SO_X$ in the exhaust stream 16 may chemically bond to catalyzed surfaces of respective substrates 31, 33, 37, 39 of the exhaust treatment devices 32, 34, 36, 38. These chemically bonded hydrocarbons may undergo a catalytic reaction and the resulting products may leave the catalyzed surfaces along with the exhaust stream 16. Since exhaust treatment devices such as DOC 32, DPF 34, SCR device 36, and AMOX device 38 are well known in the art, these devices will only be briefly described herein. As will be described below, one or more of the exhaust treatment devices 32, 34, 36, 38 may include respective substrates 31, 33, 37, 39 having, for example, a porous ceramic honeycomb structure or otherwise porous structure such as a mesh and/or filter element to maximize the available surface area. Such exemplary substrates 31, 33, 37, 39 may be constructed of any material useful in removing pollutants and/or particulates from the exhaust stream 16, such as, for example, foam cordierite, sintered metal, ceramic, or silicon carbide. Other materials that may be used for such substrates 31, 33, 37, 39 may include alumina, zeolite, aluminophosphates, and hexyluminates. Combinations of these materials may be used, and such materials may be chosen based on engine diagnostic and/or exhaust diagnostic parameters, and/or for conformity with environmental standards. Such substrates 31, 33, 37, 39 may be situated horizontally, vertically, radially, or helically. It is contemplated that such substrates 31, 33, 37, 39 may also include catalyst material capable of reacting with soot, $NO_x$, sulfur compounds, particulate matter, and/or other pollutants known in the art. The catalyst material may be coated on, impregnated within, or otherwise associated with the respective substrates 31, 33, 37, 39 to promote oxidation or reduction of some constituents (such as, for example, hydrocarbons, $SO_x$, $NO_x$, etc.) of the exhaust stream 16 as it flows through. Such catalyst coating materials may include, for example, aluminum, platinum, palladium, rhodium, barium, cerium, and/or alkali metals, alkaline-earth metals, rare-earth metals, or combinations thereof.

As shown in FIG. 1, DOC 32 may include a flow-through substrate 31 having, for example, a porous ceramic honeycomb structure or metal mesh configuration with numerous parallel channels for the exhaust stream 16 to flow through. A catalytic coating may be applied to the surface of the substrate 31 to promote oxidation of some constituents (such as, for example, hydrocarbons, $SO_x$, $NO_x$, etc.) of the exhaust stream 16 as it flows through. The honeycomb structure of the substrate 31 increases the contact area of the substrate to the exhaust stream 16 and therefore allows more of the undesirable constituents in the exhaust stream 16 to be oxidized as exhaust stream 16 flows through. It is understood that during the oxidation process, oxygen reacts with harmful emissions such as hydrocarbons and $SO_x$, for example, to produce less harmful compounds. For example, the $NO_x$ reaction may proceed as follows: $NO + O_2 \rightarrow NO_2 + H_2O$.

DPF 34 is a device used to physically separate soot or particulate matter from exhaust stream 16. DPF 34 may include a wall flow substrate 33 or other porous structure known in the art, and the substrate 33 may contain a catalyst. It is contemplated that substrate 33 may include an electrically conductive or non-conductive coarse mesh metal or porous ceramic honeycomb medium. The exhaust stream 16 may pass through the walls of the wall flow substrate 33 leaving the larger particulate matter accumulated on the walls. As is known in the art, DPF 34 may be regenerated periodically to clear and/or burn the particulate matter accumulated in substrate 33. The collected particulate matter may be passively regenerated and/or actively regenerated. When passively regenerated, the particulates deposited on the substrate 33 may chemically react with the catalyst material, for example, a base metal oxide, a molten salt, and/or a precious metal that is coated on or otherwise included within the substrate 33, to lower the ignition temperature of the particulates. The temperatures of the exhaust flow entering DPF 34 may be high enough, in combination with the catalyst, to burn away the trapped particulates. In active regeneration, a regeneration device 29, for example, a fuel-fired burner, an electric heater, or any other device known in the art, may be located upstream of the DPF to apply heat to the particular matter in order to elevate the temperature of the particulates to an ignition threshold. Regeneration device 29 may be located at any position between exhaust conduit 18 and DPF 34 in order to obtain lower phosphorus deactivation of the catalysts.

SCR device 36 and AMOX device 38 may include one or more catalyzed substrates 37 and 39, respectively, that convert $NO_x$ in exhaust stream 16 into relatively benign components, such as, nitrogen gas and water. A gaseous or liquid reagent (such as, for example, urea, ammonia gas, liquefied anhydrous ammonia, ammonium carbonate, or an ammine salt, AdBlue®, etc.) may be injected into the exhaust stream 16 by the injector 35 to enable the reduction reaction in SCR 36. The injector 35 may include a dosing system, for example a control valve 41 or an injector, that injects the reagent into exhaust stream 16. The injected reagent may decompose into $NH_3$, which may react with $NO_x$ in the exhaust stream 16 to form water ($H_2O$) and elemental nitrogen $N_2$ on the catalyzed substrate 37 of SCR 36. In one embodiment, it is contemplated that the injector 35 may be a DEF (diesel exhaust fluid) injector. It is contemplated that the substrate 37 on SCR 36 may be placed far enough downstream of the injector 35 in order for the reagent to have time to decompose into the $NH_3$ required for the reduction of $NO_x$ and to evenly distribute throughout the substrate. It is contemplated that the catalyst material on substrate 37 of SCR 36 may be different from the catalyst material in the respective substrates 31 and 33 of upstream devices 32 and 34 to accommodate downstream conditions that are different from upstream conditions such as exhaust temperatures, if desired. For example, substrate 37 may be coated with a catalyst having a lower activation temperature than that applied to the substrates 31 and 33 of the respective upstream exhaust treatment devices 32 and 34. In one embodiment, the catalyst coating on substrate 37 may be copper zeolite. During operation of SCR 36, it may be possible for too much reagent such as $NH_3$ gas to be advanced into the exhaust (i.e., $NH_3$ gas in excess of that required for appropriate $NO_x$ reduction). In this situation, known as "$NH_3$ slip," some amount of $NH_3$ may pass into the atmosphere, if not otherwise accounted for. To help minimize the magnitude of $NH_3$ slip, an AMOX device 38 may be located downstream of SCR 36. A substrate 39 of AMOX device 38 may include an oxidation catalyst that oxidizes residual $NH_3$ in the exhaust. It is contemplated that the oxidation catalyst on AMOX device 38 may be omitted, if desired.

Meanwhile, phosphorus-containing compounds in the exhaust stream 16 may deposit on the catalytic surfaces of the substrates 31, 33, 37, 39 as the exhaust stream 16 flows through the respective exhaust treatment devices 32, 34, 36, 38. Over time, this deposited phosphorus may negatively affect the performance of the exhaust treatment devices primarily through the physical masking of active sites on substrates 31, 33, 37, 39 which reduces the surface area for catalytic activity. This thereby reduces the effectiveness of exhaust treatment devices 32, 34, 36, 38. In the exhaust stream 16, phosphorus may exist in an oxide or an acid form. Phosphorus may come primarily from engine oil exposed to combustion conditions. The phosphorus in the exhaust stream 16 may deposit on, and affect the performance of all the exhaust treatment devices 32, 34, 36, 38 of FIG. 1 in a similar manner. Emissions parameters including, but not limited to, the amount, rate of deposition, and/or distribution of phosphorus on the substrates of the exhaust treatment devices 32, 34, 36, 38 may be predicted based on one or more physical models. Such models, as well as exemplary systems and methods of responding to phosphorus accumulation will be described in greater detail below.

Control system 48 may include the hardware and/or programming to predict, measure, sense, calculate, estimate, and/or otherwise determine catalyst parameters based on diagnostic and/or emissions parameters. It is contemplated that diagnostic parameters may include engine diagnostic parameters such as, for example, air/fuel ratio, timing and/or amounts of fuel injections, engine temperature, engine pressure, engine oil viscosity, engine oil flow rate, an average engine oil consumption, and engine loading. Such diagnostic parameters may also include system diagnostic parameters such as, for example, loading of the individual exhaust treatment devices, amounts, timing, and/or loading of injections, exhaust gas temperature, exhaust gas pressure, exhaust gas flow rate, as well as concentrations and/or amounts of $NO_x$, $NH_3$, oxygen, hydrocarbon, and/or other like exhaust constituents. An average engine oil consumption, which may vary based on engine speed and load, may be calculated from the engine oil flow rate. The diagnostic parameters may be associated with the power system 10. In an exemplary embodiment, catalyst parameters may include parameters signifying and/or indicative of catalyst activity, specifically, a conversion and/or transformation efficiency associated with one or more of the exhaust treatment devices 32, 34, 36, 38. For example, such parameters may include $NO_X$ conversion rates, hydrocarbon conversion rates, and $NH_3$ slip. It is to be understood that $NO_X$ conversion rates refer to the percentage of $NO_X$ contained by the exhaust that is catalytically reduced to $N_2$. Similarly, hydrocarbon conversion rates refer to the percentage of hydrocarbons that are catalytically converted to less harmful substances. $NH_3$ slip refer to the amount of $NH_3$ that is not converted by the AMOX device 38 and other exhaust treatment devices 32, 34, and 36, and passes into the atmosphere. Control system 40 may further include the hardware and/or programming to implement and/or execute one or more aftertreatment and/or engine control strategies based on predicted catalyst parameters in order to change the diagnostic and/or catalyst parameters so as to prolong life of the catalyst. Control system 40 may be configured to execute one strategy at a time, or more than one strategy simultaneously.

Sensor system 40 may be configured to sense, measure, calculate, estimate, predict and/or otherwise determine engine diagnostic and/or system diagnostic parameters. Sensor system 40 may include engine temperature, engine pressure, engine oil flow rate and/or oil viscosity sensors. Sensor system 40 may also include exhaust gas temperature sensors, exhaust gas pressure sensors, exhaust gas flow rate sensors, as well as $NO_X$, $NH_3$, oxygen, hydrocarbon sensors, and/or other like exhaust constituent sensors to determine whether exhaust emissions are in compliance with regulations. Sensor system 40 may continuously or instantaneously measure parameters. Sensor system 40 may generate data signals indicating the values of the sensed parameters and provide such signals in real-time to control module 42 and/or operator interface 46 via communication system 44.

The control module 42 may include known memory components as well as one or more computers and/or any other conventional data processors for monitoring, determining, recording, and/or controlling parameters. Control module 42 may embody a single processor or microprocessor or multiple processors/microprocessors that include a means for controlling an operation in response to signals from sensor system 40. Numerous commercially available processors/microprocessors can be configured to perform the functions of control module 42. It should be appreciated that control module 42 could readily embody a general power system processor/microprocessor capable of controlling numerous power system functions and modes of operation. The processor/microprocessor and memory components may include software code instruction sets that may be executed to perform various control and information functions, such as, for example, assisting in the operation of exhaust treatment system 14. Memory components (not shown) may include computer-readable memory or other separate storage devices, such as a random access memory (RAM), a read-only memory (ROM), a hard disk, an optical disk, a magnetic medium, a flash memory, other permanent memory, other volatile memory, or any other tangible mechanism capable of storing and/or providing instructions to the control module 42. Control module 42 may include one or more maps stored within an internal memory thereof, and control module 42 may reference these maps to control operation of exhaust treatment system 14. Each of these maps may include a collection of data in the form of tables, graphs, algorithms, and/or equations to perform analysis and/or initiate action. Control module 42 may be in direct communication with the other components of exhaust treatment system 14 to facilitate manual, autonomous, and/or remote control of exhaust treatment system 14. In one embodiment, control module 42 may be configured to supply electrical signals/pulses to the operator interface system 46 which in turn relays messages and/or instructions to an operator, and/or receive electrical signals/pulses from sensor system 40, all via communication system 44. Control module 42 may receive and/or supply signals continuously. Additionally or alternatively, control module 42 may receive and/or supply signals intermittently. Control module 42 may include one or more computers networked together, for example, to facilitate changes and/or updates throughout the network. For example, any changes in programmed operation of a control module 42 on one computer may be instantaneously transmitted to control modules 42 on other computers in the network. Control module 42 may be located proximate the exhaust treatment system 14, or alternatively, at a considerable distance remote from exhaust treatment system 14. Various other known circuits may be associated with control module 42, including power supply circuitry, signal-conditioning circuitry, solenoid driver circuitry, communication circuitry, and other appropriate circuitry.

Communication system 44 may include one or more modulators, demodulators, multiplexers, demultiplexers, network communication devices, wireless devices, antennas, modems or any other devices configured to support two-way communication. In addition, communication system 44 may communicate via satellite, cellular, infrared, radio, hardwired, or other types of wireless communication signals. Communication system 44 may also include a data recorder (not shown) having a recording medium (not shown). In some embodiments, the recording medium may be portable to facilitate transfer of data.

Operator interface system 46 may include any components or systems known in the art for receiving input from, and/or providing output to, an operator of the machine with which the exhaust treatment system 14 is associated. For example, operator interface system 46 may include one or more displays, monitors, touch-screens, keypads, keyboards, levers, joysticks, wheels, pedals, and/or other such input/output devices and associated systems for controlling operations of the control system of the exhaust treatment device. The displays may include a cathode ray tube (CRT), liquid crystal display (LCD), light-emitting diode (LED), plasma, or other type of display device known in the art. Operator interface system 46 may display a textual comparison between diagnostic, emissions, and/or catalyst parameters, or a visual depiction, such as a map, of an action performed. In addition and/or in place of a display, the operator interface system 46 may include one or more speakers or other like components configured to transmit audible commands.

Figure 2:
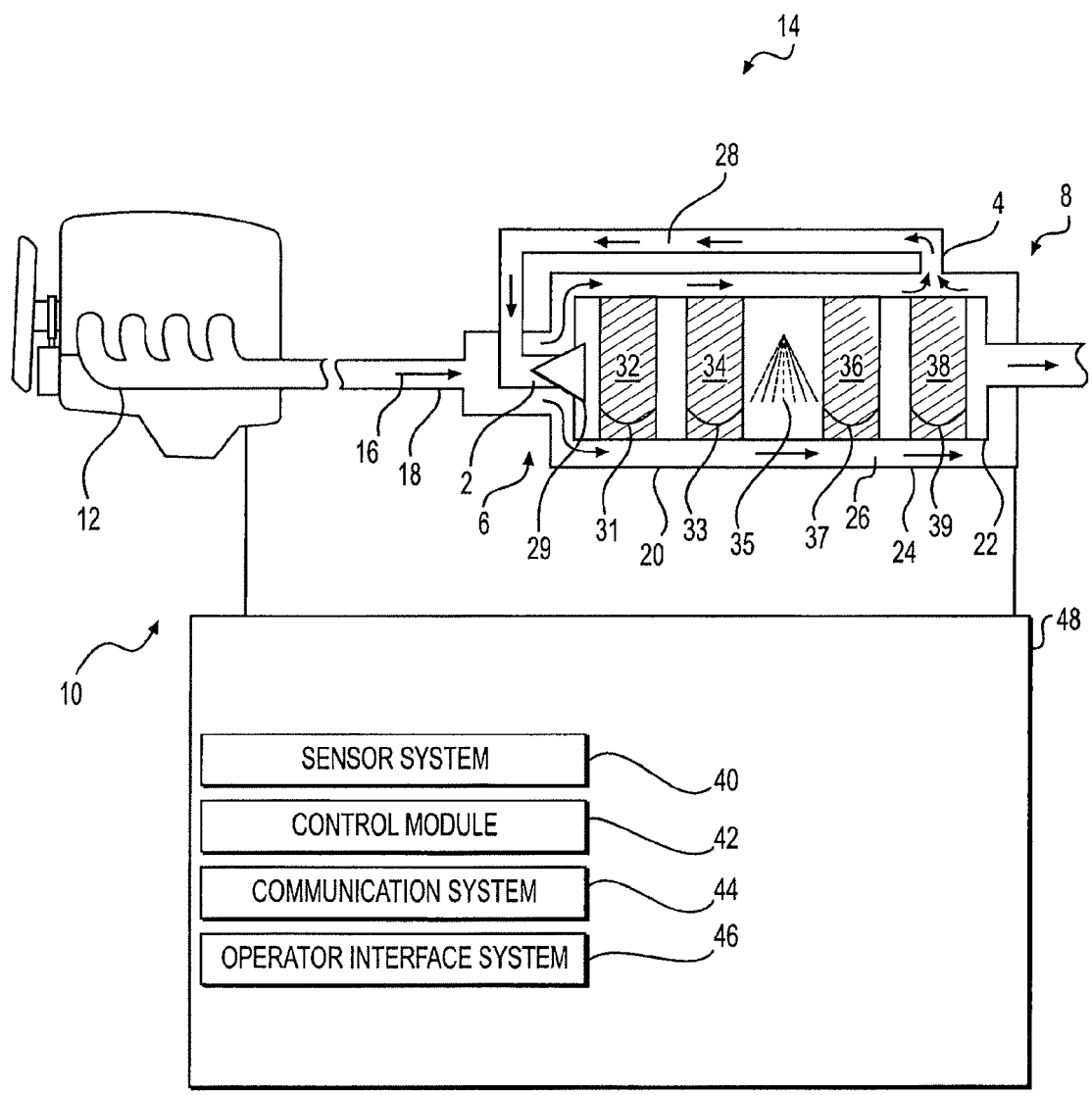
FIG. 2 is an illustration of an alternative power system with an exemplary exhaust treatment system.

FIG. 2 illustrates an alternative embodiment of power system 10. Similar to the embodiment of FIG. 1, power system 10 of FIG. 2 may also include an engine 12 having an exhaust treatment system 14 including one or more exhaust treatment devices 32, 34, 36, 38, and a control system 48. However, in contrast to the embodiment of FIG. 1, the exhaust treatment system 14 shown in FIG. 2 may direct exhaust stream 16 around a periphery of the exhaust treatment devices 32, 34, 36, 38 before directing exhaust stream 16 through the exhaust treatment devices 32, 34, 36, 38.

The exhaust treatment system 14 of FIG. 2 may include an exhaust conduit 18 fluidly coupled to a can 20 that surrounds and/or houses one or more exhaust treatment devices 32, 34, 36, 38 positioned therein. Can 20 may include an inner chamber 22 that encloses the exhaust treatment devices 32, 34, 36, 38 and an outer chamber 24 that is disposed around inner chamber 22 and defines an annular space 26 surrounding the inner chamber 22. A treatment conduit 28 may fluidly couple an outlet 4 of the outer chamber 24 at a downstream end 8 of the outer chamber 24 to an inlet 2 of the inner chamber 22 at an upstream end 6 of the inner chamber 22.

It should be noted that the exhaust treatment devices 32, 34, 36, 38 illustrated in FIG. 2 are exemplary only, and other embodiments of exhaust treatment system 14 may include less, more, or other types of exhaust treatment devices. In some embodiments, multiple cans 20 may be used in place of single can 20 illustrated in FIG. 2, and in other embodiments, can 20 may be eliminated and the various exhaust treatment devices 32, 34, 36, 38 may be positioned at different locations within exhaust conduit 18.

INDUSTRIAL APPLICABILITY

The exhaust treatment systems of the current disclosure may be used in any application where it is desired to decrease phosphorus aging of exhaust treatment devices 32, 34, 36, 38. Such applications may include, for example, construction, farming, mining, drilling, and/or general transportation, In such applications, decreased phosphorus aging will help satisfy modern emissions standards while providing a longer-lasting catalyst. In exemplary embodiments, the exhaust treatment systems 14 of the current disclosure may be used with a power system 10. An exemplary application of the exhaust treatment systems 14 will now be described with reference to FIGS. 1 and 2.

With reference to FIG. 1, exhaust conduit 18 may direct the exhaust stream 16 through the exhaust treatment devices 32, 34, 36, 38. With reference to FIG. 2, exhaust conduit 18 may direct the exhaust stream 16 through the annular space 26 along the length of can 20 before directing the exhaust stream 16 through treatment conduit 28, and into the inner chamber 22 through inlet 2. Within the inner chamber 22 the exhaust stream 16 may flow through the exhaust treatment devices 32, 34, 36, 38 before exiting can 20. Thus, as illustrated in FIG. 2, exhaust stream 16 is directed around the periphery of exhaust treatment devices 32, 34, 36, 38 before being directed through these exhaust treatment devices 32, 34, 36, 38. It is also contemplated that the exhaust stream 16 may be directed through can 20 without being directed around exhaust treatment devices 32, 34, 36, 38. With reference to both FIG. 1 and FIG. 2, as exhaust stream 16 flows through the exhaust treatment devices 32, 34, 36, 38, one or more constituents in the exhaust stream 16 may be separated and/or be converted into more benign compounds. The relatively cleaner exhaust stream 16 may then be directed out of the exhaust treatment devices 32, 34, 36, 38.

Figure 3:
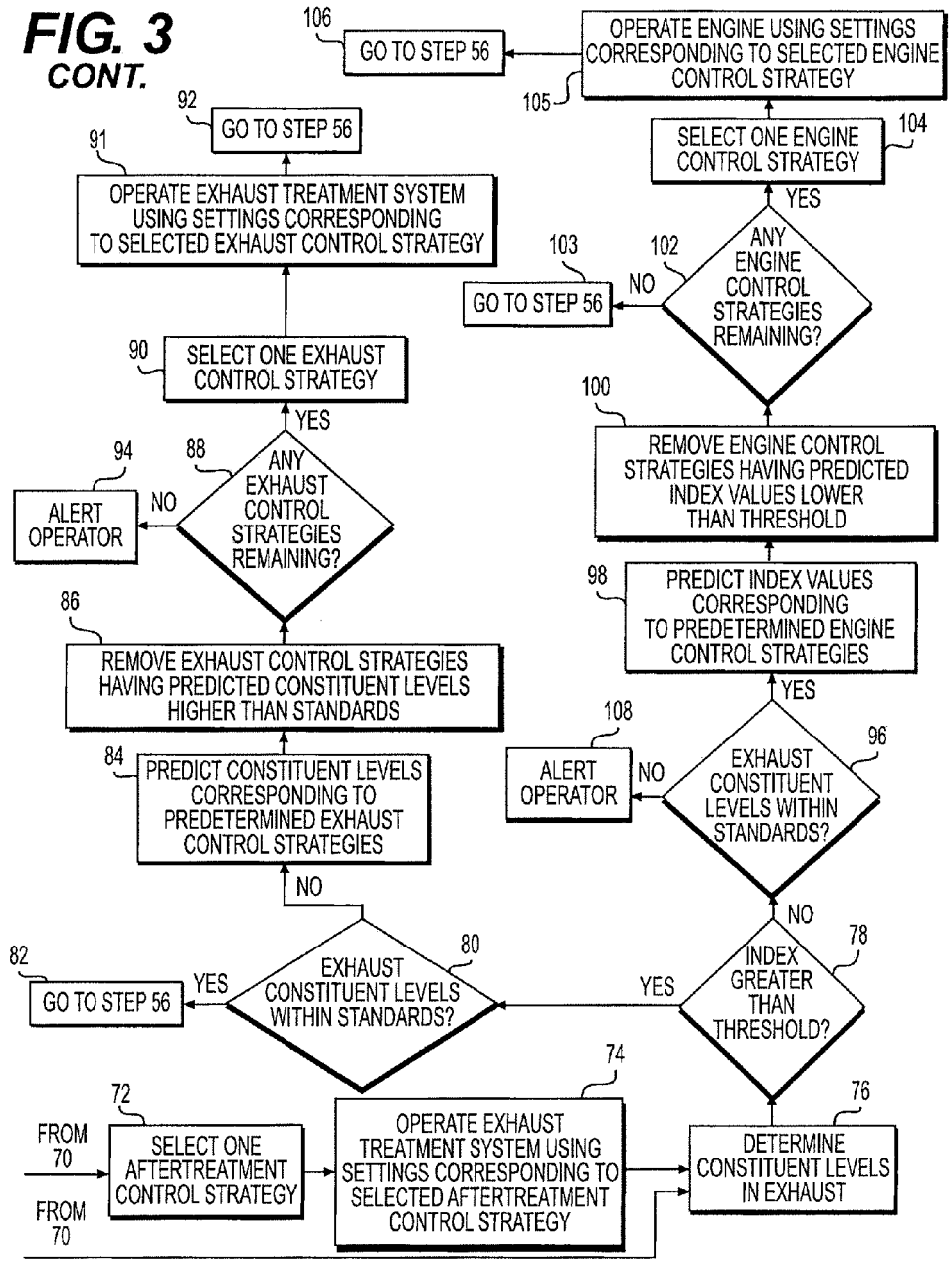
FIG. 3 is a flow chart illustrating a method of operating an exemplary disclosed exhaust treatment system.

Meanwhile, phosphorus in exhaust stream 16 may also be physically deposited on the catalyzed substrates 31, 33, 37, 39 of the exhaust treatment devices 32, 34, 36, 38 and mask regions of the catalyzed substrates 31, 33, 37, 39 from the hydrocarbons, thereby decreasing the conversion efficiency of the substrates 31, 33, 37, 39. Control system 48 of exhaust treatment system 14 may predict at least one catalyst parameter based on at least one engine diagnostic and/or emissions parameters, calculate a weighted index based on the at least one catalyst parameter, select one or more control strategies, and deliver one or more signals to operate the exhaust treatment system and/or engine using settings corresponding to the one or more control strategies. The control strategies may be selected based on the at least one catalyst parameters, emissions parameters, diagnostic parameters, ambient conditions, and/or weighted index. It is contemplated that the programming of control system 48 may include algorithms, control maps, look-up tables, and other suitable programs stored in memory. The control strategy may include an aftertreatment control strategy, an exhaust control strategy, and/or an engine control strategy. An exemplary method of predicting such parameters and determining such courses of action is depicted in the flow chart shown in FIG. 3.

In exemplary embodiments, physical properties of the substrates 31, 33, 37, 39 such as diameter, length, cell density, wall thickness, catalyst formulation and properties, and/or other relevant properties of the substrates 31, 33, 37, 39 and/or exhaust treatment devices 32, 34, 36, 38, may be stored in memory of control module 42. At step 50 the values of one of more coefficients of the predicted diagnostic, emissions, and/or catalyst parameters and/or thresholds for diagnostic, emissions, and/or catalyst parameters may be set by an operator. Alternatively, at step 50, one or more of the values, physical properties, and/or other parameters described about may be automatically set by the control module 42 based on one or more stored programs. The coefficients of the predicted parameters may be weighting coefficients in that they may signify the relative weight of each parameter. For example, the coefficients of the catalyst parameters may be used by control module 42 in determining a weighted index of predicted catalyst parameters, with the respective coefficients signifying the weight of each catalyst parameter in the resulting index, as will be described in step 62. The thresholds of the parameters and/or index may be used to determine the control strategies chosen, and the mechanisms of operation for the exhaust treatment system and/or engine. For example, if an index of predicted catalyst parameters is outside a threshold, the exhaust treatment system 14 may execute one or more control strategies that differ from those executed if the index is within a threshold. In one embodiment, an engine control strategy is chosen only if the preset threshold is not met. Because an engine control strategy may lower fuel efficiency of the engine, an engine control strategy may involve a tradeoff between emissions and fuel efficiency. It is contemplated that an engine control strategy will not be undertaken unless an operator and/or control module determines that meeting a threshold takes precedence over fuel efficiency. As will be discussed below, the coefficients of the parameters and/or thresholds may be changed either by an operator via operator interface system 46 or automatically by control module 42 as a result of control strategies executed, current and/or predicted diagnostic, emissions, and/or catalyst parameters, in step 64.

During operation, engine 12 may produce an exhaust stream 16, and the exhaust stream 16 may be directed from engine 12 to exhaust treatment system 14 (step 54). At step 56, the control module 42 and/or sensor system 40 may sense, measure, calculate, estimate, predict, and/or otherwise determine one or more diagnostic parameters. The diagnostic parameters may be determined at various locations, for example, proximate one or more of the exhaust treatment devices 32, 34, 36, 38. The diagnostic parameters may be determined continuously or at discrete intervals. Step 56 may further include the control module 42 generating one or more signals indicative of the values of the determined diagnostic parameters and/or transmitting the signals to operator interface system 46 from control module 42. The diagnostic parameters may be communicated and/or displayed to an operator via communication system 44 at operator interface system 46.

In step 58, one or more emissions parameters may be predicted and/or otherwise determined as a function of one or more of the diagnostic parameters that were determined in step 56, and/or physical properties of the substrates 31, 33, 37, 39 and/or respective exhaust treatment devices 32, 34, 36, 38. It is contemplated that the emissions parameters may be predicted by control module 42 using a non-linear model of catalyst degradation over time. The emissions parameters may be predicted by using maps with data stored within memory in the form of tables, graphs, algorithms, and/or equations. The data may have been collected from lab and/or field operation or experiments of exhaust treatment system 14, such that the predicted emissions parameters are based on actual physical models. Control module 42 may reference these maps in order to predict emissions parameters. The inputs to the control module 42 may include the one or more diagnostic parameters and/or physical properties of the substrates 31, 33, 37, 39, and/or respective exhaust treatment devices 32, 34, 36, 38, while the resulting outputs of the maps may include emissions parameters. The predicted emissions parameters may be communicated and/or displayed to an operator via communication system 44 at operator interface system 46.

In step 60, one or more catalyst parameters may be predicted and/or otherwise determined as a function one or more of the emissions parameters, diagnostic parameters, and/or physical properties of the substrates 31, 33, 37, 39 and/or respective exhaust treatment devices 32, 34, 36, 38. The catalyst parameters may be predicted by using maps with data stored within memory in the form of tables, graphs, algorithms, and/or equations. The data may have been collected from lab and/or field operation or experiments of exhaust treatment system 14, such that the predicted emissions parameters are based on actual physical models. The predicted catalyst parameters may be communicated and/or displayed to an operator via communication system 44 at operator interface system 46. If desired, the predicted catalyst parameters may be compared with values of calculated catalyst parameters. The calculations may be conducted using measurements determined by the sensors (i.e. $NO_X$ and hydrocarbon sensors). Although not illustrated in FIG. 3, the control module 42 may conduct an error analysis and update, in a closed-loop manner, any maps used for prediction based on sensor measurements or other parameters. For example, an actual catalyst parameter may be calculated by taking measurements of a diagnostic parameter (i.e. $NO_X$ concentration, hydrocarbon concentration $NH_3$ concentration at different locations) at distinct time intervals, and/or at distinct locations. The calculated catalyst parameter may be compared to the corresponding predicted catalyst parameter.

Once the values of the predicted catalyst parameters are obtained, the control module 42 may calculate and/or otherwise determine a weighted index of one or more predicted catalyst parameters based on the predicted catalyst parameters as well as the coefficients of the corresponding catalyst parameters in step 62. It is contemplated that the values of predicted catalyst parameters may be converted into values signifying the predicted catalyst parameters in order to simplify calculations. For example, the actual value of the $NH_3$ slip may be converted into the reciprocal of the $NH_3$ slip for calculations. It is contemplated that a higher value of the index is desired because it may signify more desirable conversion efficiencies. For example, in one embodiment, control module 42 may determine the weighted index by taking the sum of the products resulting from the coefficients and corresponding values signifying the catalyst parameters. For example, control module 42 may determine part of the weighted index by multiplying the $NH_3$ slip weighting coefficient by the reciprocal of the $NH_3$ slip, adding the result to the product of the $NO_2$ weighting coefficient and $NO_2$ conversion rate. Alternatively, the values of the predicted catalyst parameters themselves may be used for the calculations.

In step 64, the control module 42 and/or operator may decide whether to modify the system programming based on diagnostic parameters determined in step 56. The diagnostic, emissions, and/or catalyst parameters, weighted index, threshold, and/or the coefficients may be displayed to the operator via operator interface system 46. In an exemplary embodiment, during the initial run through the system, the control module 42 and/or operator may not have the option to modify some or all of the system programming because the programming may already have been set in step 50. In such an embodiment, during subsequent run-throughs, the coefficients of parameters and/or thresholds may be changed if desired. The capability of changing the coefficients of parameters illustrates the possibility of tradeoffs between catalyst parameters, because optimizing the value of one catalyst parameter may result in a less optimal value of another catalyst parameter. If the coefficients of parameters and/or thresholds are changed, an index of predicted catalyst parameters may be determined again by control module 42 based on the new coefficients in step 62.

Step 66 may include determining and/or predicting index values corresponding to respective predetermined aftertreatment control strategies. Aftertreatment control strategies may include any functions performed on exhaust treatment system 14, such as changing the frequency, amounts, and/or locations of injections at 35, the timing and/or amounts of aftertreatment fuel injections, changing the activity of the regenerator 29, and any other aftertreatment control strategies known in the art. In step 66, control module 42 may predict and/or simulate a resulting index value in the event that an aftertreatment control strategy is run. For the sake of clarity, the predicted index values in step 66 may be referred to as first index values. It is contemplated that an aftertreatment control strategy may be a predetermined algorithm that defines a specific machine component setting, or any combination of predetermined algorithms. The control module 42 may predict the resulting index values for all possible aftertreatment control algorithms and combinations of aftertreatment control algorithms. For example, the control module 42 may predict the index values that may result from one of changing the rate of injections, increasing the activity of the burner, as well as a combination of changing injection rate and increasing burner activity. Control module 42 may predict the resulting index values by predicting the diagnostic parameters that may result from executing the aftertreatment control strategies. The diagnostic parameters may be predicted by using predefined maps with data stored within memory in the form of tables, graphs, algorithms, and/or equations. From the predicted diagnostic parameters, the control module 42 may predict the emissions parameters and catalyst parameters resulting from the diagnostic parameters in a manner similar to that explained above in steps 58 and 60. Using the one or more weighted coefficients, control module 42 may calculate and/or determine first index values based on the predicted values of one or more resulting catalyst parameters.

In step 68, after predicting and/or determining the index values for all the aftertreatment control strategies, the control module may remove the control strategies having predicted index values less than the weighted index, or alternatively, less than or equal to the weighted index. It is contemplated that in this manner, the control strategies having predicted index values less than the current weighted index may not be considered for execution. In step 70, control module 42 may determine whether there are any aftertreatment control strategies remaining after the control strategies less than the current weighted index have been removed. The only aftertreatment control strategies that would remain would be those with index values greater than the weighted index, or alternatively, greater than or equal to the weighted index. In the event that control module 42 determines the existence of one or more aftertreatment control strategies in step 70, control module 42 may select one aftertreatment control strategy in step 72. It is contemplated that the control module 42 may select the aftertreatment control strategy with the highest index, or select an aftertreatment control strategy based on one or more of ambient conditions, preset threshold, diagnostic parameters, emissions parameters, exhaust parameters, and physical properties of substrates 31, 33, 37, 39 of exhaust treatment devices 32, 34, 36, 38, and physical properties of exhaust treatment devices 32, 34, 36, 38. The control module 42 may select the aftertreatment control strategy based on one or more algorithms and/or protocols. Alternatively, it is contemplated that the control module 42 may prompt an operator to select an aftertreatment control strategy only if the index of the operator-selected strategy exceeds the threshold. Alternatively, it is contemplated that the control module 42 may provide an operator the option of not selecting an aftertreatment control strategy even if the predicted index values exceed the weighted index. Following selection of an aftertreatment control strategy, control module 42 may deliver one or more signals to operate the exhaust treatment system 14 using settings corresponding to the selected aftertreatment control strategy in step 74. The new value of the index may be stored in memory of control module 42. Specific instructions of the control strategies may be executed by the microprocessors and memory components. As part of step 74, a report monitoring progress of the control strategies may be generated. Control module 42 may modify programs in memory either automatically or manually by the operator as a result of each report.

In the event that the control module 42 determines that there are no aftertreatment control strategies remaining in step 70 the control module 42 may proceed to step 76 as will be discussed below.

In step 76, sensor system 40 and control module 42 may determine the constituent levels in exhaust. For example, constituent levels in the exhaust downstream of the exhaust treatment system may be determined. Constituent levels in exhaust may include measurements of levels of CO, hydrocarbons, $NO_X$, sulfur, particulate matter, and other exhaust emissions known in the art. It is contemplated that there may be a set of constituent levels. The constituent levels may be compared to applicable regulatory standards in order to ensure compliance with the applicable regulatory standards as will be discussed below.

In step 78, the control module 42 may determine whether the index (i.e. either the index stored in memory in step 74 if an aftertreatment control strategy was selected in step 72 or the index determined in step 62 if no aftertreatment control strategy was selected in step 72) is greater than the threshold value set in step 50. If the control module 42 determines that the index is greater than a threshold, the control module 42 may proceed to step 80 in order to determine whether exhaust constituent levels are in compliance with applicable regulatory standards. If control module 42 determines that exhaust constituent levels may be in compliance with applicable regulatory standards then the control module 42 may direct power system 10 back to step 56. If it is determined by the control module 42 that exhaust constituent levels are not in compliance with applicable regulatory standards, the control module 42 will select an exhaust control strategy to bring the exhaust constituent levels in compliance with standards in steps 84-92, if possible. In step 84, in a manner analogous to the method in step 66, the control module 42 may determine and/or predict one or more, or a set of, constituent levels corresponding to predetermined exhaust control strategies. It is contemplated that an exhaust control strategy may be a predetermined algorithm that defines a specific machine component setting, or any combination of predetermined algorithms. The control module 42 may predict the resulting constituent levels for all possible exhaust control algorithms and combinations of exhaust control algorithms. The constituent levels may be predicted by using predefined maps with data stored within memory in the form of tables, graphs, algorithms, and/or equations. In step 86, analogous to step 68, control module 42 may remove any exhaust control strategies having predicted constituent levels higher than those in applicable regulatory standards. In step 88, control module 42 may determine whether any exhaust control strategies remain. If, in step 88, control module 42 determines that no exhaust control strategies may bring constituent levels in compliance with applicable regulations, the control module 42 may alert an operator to schedule maintenance in step 94. If control module 42 determines the existence of exhaust control strategies that may bring the constituent levels in compliance with applicable regulations, the control module 42 may select one exhaust control strategy in step 90 similar to the process in step 72. It is contemplated that the control module 42 may automatically select the exhaust control strategy having the lowest constituent levels and/or automatically select an exhaust control strategy using predefined algorithms and/or protocols. Control module 42 may calculate and/or determine a numeral based on the one or more constituent levels and coefficients of constituent levels using one or more preprogrammed algorithms. For example, control module 42 may determine the numeral by taking the sum of the products of the coefficients of constituent levels and corresponding constituent levels. The control module 42 may select the exhaust control strategy having the lowest numeral in one embodiment. It is also contemplated that the control module 42 may prompt the operator to select an exhaust control strategy. After selecting one exhaust control strategy, control module 42 may operate the exhaust treatment system 14 according to settings corresponding to the selected exhaust control strategy in step 91. In step 92, the control module 42 may direct the power system 10 back to step 56 following step 91.

In the event that the control module 42 determines that the index may not be greater than a threshold value in step 78, the control module 42 may determine whether the exhaust constituent levels are in compliance with applicable regulatory standards in step 96. If the control module 42 determines a lack of compliance, the control module 42 may alert an operator to perform maintenance in step 108. If the control module 42 determines that the exhaust constituent levels are compliant with applicable regulatory standards, the control module 42 may select an engine control strategy to increase the index above the threshold set in step 50, if possible, in steps 98-106. It is contemplated that engine control strategies may include changing the air/fuel ratio, changing the amounts and/or timing of fuel injections, posts, and pilots, running the engine under heavy loads (i.e. at least 25% at idle), and other known engine control strategies in the art. In step 98, in a manner analogous to that in steps 66 and 84, the control module 42 may determine and/or predict index values corresponding to predetermined engine control strategies. The index values corresponding to predetermined engine control strategies may be referred to as second index values for clarity. It is contemplated that an engine control strategy may be a predetermined algorithm that defines a specific machine component setting, or any combination of predetermined algorithms. The control module 42 may predict the resulting index values for all possible engine control algorithms and combinations of engine control algorithms. The control module 42 may predict one or more of the resulting diagnostic parameters in the event that an engine control strategy is executed. From the resulting diagnostic parameters, the control module 42 may predict one or more of emissions parameters, exhaust parameters, and/or a weighted index of exhaust parameters. After step 98, control module 42 may remove the engine control strategies having predicted index values lower than the threshold in step 100. After step 100, control module may determine whether any entire control strategies remain in step 102. If the control module 42 determines that no engine control strategies may increase the index above the preset threshold, control module may direct power system 14 to step 103, and return to step 56 to continue running. If the control module 42 determines the existence of engine control strategies, the control module 42 may select one engine control strategy in step 104, similar to the manner in which an aftertreatment control strategy is selected in step 72. In another embodiment, the control module 42 may select one or more control strategies that maximize fuel efficiency while satisfying regulations via a combination of engine control and aftertreatment control strategies. It is further contemplated that the one or more engine and/or aftertreatment control strategies may be selected based on diagnostic parameters, emissions parameters, exhaust parameters, and/or ambient conditions and that the control module 42 may respond instantaneously to any changes in parameters and/or conditions. It is contemplated that the control module 42 may select the engine control strategy with the highest index, select an engine control strategy according to preprogrammed algorithms and/or protocols, or prompt an operator to select an engine control strategy. In step 105, the control module may send one or more signals to the relevant locations of power system 10 in order to operate the engine 12 using settings that correspond to the selected engine control strategy. In step 106, the control module 42 may direct the power system 10 back to step 56.

It is also contemplated that the method may involve either closed-loop or open-loop control. In an exemplary closed-loop control strategy, the control module 42 may continuously receive signals from the sensor system 40 during operation. In addition, control module 42 may continuously generate command signals and/or send the signals to the operator interface system 46. Alternatively, in an exemplary open-loop control strategy, the control module may only receive signals at discrete intervals during operation and execute programs, generate and send command signals accordingly. In such an exemplary embodiment, the open-loop control strategy may be initiated manually. The control strategies may respond to each of the exhaust treatment devices 32, 34, 36, 38 in a specific manner as will be detailed below.

In the event that the hydrocarbon conversion rate of the DOC 32 decreases below a threshold, step 66 may include predicting index values corresponding to predetermined aftertreatment control strategies. In an exemplary embodiment, the control strategy selected in step 72 may include changing the timing and/or amounts of injections of hydrocarbon, fuel and/or urea. For example, to prevent excessive hydrocarbon slip, the hydrocarbon injection amounts may be reduced. It is contemplated that the operator may decide which aftertreatment control strategy to execute based on the resulting effects of predicted catalyst parameters in step 72. For example, the operator may decide whether and by how much to change the timing and/or amounts of fuel and/or urea. Because this step may increase $NO_X$ emissions, updated $NO_X$, other exhaust levels, other diagnostic parameters, and predicted exhaust and catalyst parameters may be updated to memory in step 74.

In another example, if the rate of $NO_2$ oxidation performed by the DOC 32 is decreased below a threshold, step 66 may include predicting index values corresponding to predetermined aftertreatment control strategies. In an exemplary embodiment, the selected control strategy in step 72 may include changing the amounts and/or frequency of injections at one or more locations. For example, the amounts and/or frequency of injections upstream of the SCR device 36 may be increased. It is contemplated that the amounts and/or frequency of urea injections may be updated. It is also contemplated that the operator may decide whether and by how much to increase the dosing before the SCR device 36. This strategy may compensate for the reduced conversion of $NO_X$ to $N_2$ occurring over the SCR device 36 due to a less than favorable $NO_2/NO_X$ ratio of the exhaust gas entering the SCR device 36. Because this step may increase the $NH_3/NO_X$ ratio, updated $NH_3$ slip, other exhaust levels, and/or other diagnostic parameters, and predicted exhaust and catalyst parameters may be updated to memory in step 74. It is contemplated that the operator may decide whether and by how much to increase the dosing before the SCR device 36.

In another example, in the event that one or more of the catalyst parameters of the SCR device 36 (i.e. $NO_X$ conversion rate, $NH_3$ conversion rate) falls below a threshold, step 66 may include predicting index values corresponding to predetermined aftertreatment control strategies. In an exemplary embodiment, the control strategy selected in step 72 may include one or more of the following: modifying the fuel injection timing, number and timing of pilots and posts and/or amounts of injections to reduce the $NO_X$ emissions from the engine in order to compensate partially or fully for the loss of $NO_X$ conversion over the SCR device 36. It is known to one of ordinary skill in the art that pilots refer to injections of fuel before the main fuel injection and posts refer to injections of fuel after the main fuel injection. Additionally, the amounts of the urea injected may be increased or decreased depending, for example, on the relative values of the $NO_X$ conversion rate and the $NH_3$ conversion rate and the ambient temperature. On the SCR device 36, the $NH_3$ conversion rate may be modeled as a first-order reaction while the $NO_X$ conversion rate may be modeled as a higher order reaction rate. The timing, locations, and/or amounts of injections may also be modified using programmed instructions. The instructions may identify a sequence of paths of the injections, corresponding fluid delivery amounts delivered to the paths, and the timing of injections on each path. Other variables relating to the injections such as the flow rate, width distribution, direction and/or pattern of the injections may be varied by the control module 42 in accordance with various fluid delivery parameters. Control module 42 may communicate via communication system 44 to display on operator interface system 46 a map of the sequence of paths of the injections, corresponding fluid delivery amounts and timing, in step 72 to allow an operator to select an aftertreatment control strategy It will be apparent to those skilled in the art that various modifications and variations can be made to the disclosed exhaust treatment system. Other embodiments will be apparent to those skilled in the art from consideration of the specification and practice of the disclosed exhaust treatment system. It is intended that the specification and examples be considered as exemplary only, with a true scope being indicated by the following claims and their equivalents.

What is claimed is:

1. A method of controlling a power system including an engine and an exhaust treatment system having an exhaust treatment device, comprising:
   determining current constituent levels;
   determining a plurality of sets of potential constituent levels, wherein each set of potential constituent levels is predicted as a function of a corresponding respective aftertreatment control strategy;
   determining a catalyst parameter indicative of a conversion efficiency of the exhaust treatment device;
   determining a weighted index based on the catalyst parameter;
   determining a plurality of first index values, wherein each first index value of the plurality of first index values is predicted as a function of the corresponding respective aftertreatment control strategy;
   selecting a selected aftertreatment control strategy based on a comparison between the weighted index and each first index value of the plurality of first index values, wherein the selected aftertreatment control strategy changes the catalyst parameter; and
   using an injector to operate the exhaust treatment system according to settings corresponding to the selected aftertreatment control strategy.

2. The method of claim 1, further comprising removing aftertreatment control strategies with predicted first index values less than the weighted index.

3. The method of claim 1, further comprising alerting an operator to perform maintenance based on a comparison between each set of potential constituent levels and corresponding respective preset standards.

4. The method of claim 1, further comprising:
   selecting the selected aftertreatment control strategy based on a comparison between each set of potential constituent levels and corresponding respective preset standards;
   operating the exhaust treatment system according to settings corresponding to the selected aftertreatment control strategy; and
   determining a diagnostic parameter associated with the power system under operation of the selected aftertreatment control strategy.

5. The method of claim 1, wherein selecting the selected aftertreatment control strategy includes selecting from aftertreatment control strategies corresponding to first index values greater than the weighted index.

6. The method of claim 5, further comprising selecting an aftertreatment control strategy with a largest predicted first index value.

7. The method of claim 1, further comprising:
   predicting a plurality of second index values, wherein each second index value of the plurality of second index values is determined as a function of the corresponding respective engine control strategy;
   selecting a selected engine control strategy based on a comparison between each second index value and a threshold associated with the exhaust treatment system;
   operating the power system according to settings corresponding to the selected engine control strategy; and
   determining a diagnostic parameter associated with the power system under operation of the selected engine control strategy.

8. The method of claim 7, further comprising alerting an operator to perform maintenance based on the comparison between each second index value and the threshold.

9. A method of controlling a power system including an engine and an exhaust treatment system, the method comprising:
   determining a diagnostic parameter associated with the power system;
   determining an emissions parameter associated with the exhaust treatment system based on the diagnostic parameter, wherein determining the emissions parameter comprises one of a phosphorus distribution, a phosphorus rate of deposition, and an amount of phosphorus on a catalyst;
   predicting a catalyst parameter associated with the exhaust treatment system based on the emissions parameter;
   determining a weighted index based on the predicted catalyst parameter;
   determining a plurality of index values, wherein each index value of the plurality of index values is determined as a function of a corresponding respective aftertreatment control strategy; and
   selecting a selected aftertreatment control strategy based on a comparison between the weighted index and each index value of the plurality of index values, wherein the selected aftertreatment control strategy is characterized by using an injector to change an operation setting on the exhaust treatment system.

10. The method of claim 9, wherein selecting the aftertreatment control strategy comprises selecting from aftertreatment control strategies with index values greater than the weighted index and removing the aftertreatment control strategies corresponding to the index values lower than the weighted index.

11. The method of claim 9, wherein determining the diagnostic parameter comprises determining a parameter related to engine function, exhaust treatment device function, or exhaust properties.

12. The method of claim 9, further including
   predicting a plurality of second index values, wherein each second index value of the plurality of second index values is determined as a function of the corresponding respective engine control strategy;
   selecting a selected engine control strategy based on a comparison between each second index value and a threshold associated with the exhaust treatment system;
   operating the power system according to settings corresponding to the selected engine control strategy; and
   determining the diagnostic parameter associated with the power system under operation of the selected engine control strategy.

13. The method of claim 9, wherein the selected aftertreatment control strategy includes operating the injector associated with the exhaust treatment-system using an injection flow rate and frequency associated with the selected aftertreatment control strategy, and determining a constituent level resulting from operating the injector at the injection flow rate.

14. The method of claim 13, further including comparing the constituent level to a regulation standard and determining a plurality of sets of potential constituent levels in response to the comparison, wherein each set of potential constituent levels is predicted as a function of the corresponding respective exhaust control strategy.

15. The method of claim 14, further including determining that the weighted index exceeds a predetermined index threshold associated with the exhaust treatment system, and comparing the constituent level to the regulation standard in response to determining that the weighted index is greater than the predetermined index threshold.

16. A power system comprising an engine and an exhaust treatment system for the engine, the exhaust treatment system including:
- an exhaust treatment device including a substrate, the substrate having a catalyst coating;
- a sensor system configured to determine a diagnostic parameter and an exhaust level associated with the power system;
- a control module in communication with the sensor system, the control module including a processor and a memory and being configured to:
- determine current constituent levels;
- determine a plurality of sets of potential constituent levels, wherein each set of potential constituent levels is predicted as a function of a corresponding respective exhaust control strategy;
- determine a catalyst parameter indicative of a conversion efficiency of the power system;
- determine a weighted index based on the catalyst parameter;
- predict a plurality of index values, wherein each index value of the plurality of index values is predicted as a function of the corresponding respective aftertreatment control strategy;
- select a selected aftertreatment control strategy based on a comparison between the weighted index and each index value of the plurality of index values, wherein the selected aftertreatment control strategy changes the catalyst parameter;
- operate the exhaust treatment system according to settings corresponding to the selected aftertreatment control strategy; and
- save a selected index value corresponding to the selected aftertreatment control strategy to the memory.

17. The system of claim 16, further comprising a can including:
- an inner chamber enclosing the exhaust treatment device; and
- an outer chamber positioned around the inner chamber with an annular space defined therebetween; and
- an exhaust conduit being configured to direct exhaust gas through the annular space before directing the exhaust gas into the inner chamber.

18. The system of claim 17, further comprising an injector including a control valve located inside the can.

19. A machine comprising a power system including an engine and an exhaust treatment system for the engine, the exhaust treatment system including:
- an exhaust treatment device including a substrate, the substrate having a catalyst coating;
- a sensor system configured to determine a diagnostic parameter and an exhaust level associated with the power system;
- a control module in communication with the sensor system, the control module including a processor and a memory and being configured to:
- determine the diagnostic parameter associated with the power system;
    - determine an emissions parameter associated with the exhaust treatment system based on the diagnostic parameter, wherein determining the emissions parameter comprises one of a phosphorus distribution, a phosphorus rate of deposition, and an amount of phosphorus on a catalyst;
- determine a catalyst parameter based on the emissions parameter, the catalyst parameter being indicative of a conversion efficiency of the power system;
- determine a weighted index based on the catalyst parameter;
- predict a plurality of index values, wherein each index value of the plurality of index values is predicted as a function of a corresponding respective aftertreatment control strategy;
- select a selected aftertreatment control strategy based on a comparison between the weighted index and each index value of the plurality of index values, wherein the selected aftertreatment control strategy changes the catalyst parameter; and
- operate the exhaust treatment system according to settings corresponding to the selected aftertreatment control strategy.

* * * * *